United States Patent [19]

Kolongowski

[11] 4,377,270
[45] Mar. 22, 1983

[54] BOW HOLDER

[76] Inventor: Sidney C. Kolongowski, 9128 Shinanguag, Goodrich, Mich. 48438

[21] Appl. No.: 171,985

[22] Filed: Jul. 24, 1980

[51] Int. Cl.³ .......................................... F16M 13/00
[52] U.S. Cl. ............................................... 248/441 R
[58] Field of Search ............... 248/121, 122, 172, 178, 248/201, 310, 441 R, 514, 538, 670; 124/23 R, 23 A

[56] References Cited

U.S. PATENT DOCUMENTS

| | | | |
|---|---|---|---|
| 1,131,802 | 3/1915 | Stenshoel | 248/178 X |
| 1,851,779 | 3/1932 | Slater | 124/23 A |
| 2,466,801 | 4/1949 | Fong | 248/538 |
| 2,899,155 | 8/1959 | Rogers | 248/514 |
| 2,973,929 | 3/1961 | Zawadzki | 248/514 X |
| 3,139,252 | 6/1964 | Mann | 248/538 |
| 3,140,069 | 7/1964 | McBurney et al. | 248/201 X |
| 3,256,872 | 6/1966 | Koser | 248/463 X |
| 3,584,820 | 6/1971 | Butcher | 248/122 |

Primary Examiner—William H. Schultz
Attorney, Agent, or Firm—Gerald E. McGlynn, Jr.

[57] ABSTRACT

An archery bow holder for maintaining a bow in a predetermined rest position including a primary support structure. The primary support structure supports a first auxiliary support structure mounted thereon for adjustment relative thereto. The primary support structure also supports a second auxiliary support cradle spaced from the first auxiliary support structure for adjustment relative thereto to hold bows of varying sizes in a predetermined rest position. The support cradle includes axially adjustable retaining members for vertically and laterally supporting the bow and for allowing the bow to be removed from the holder with a minimum amount of noise.

8 Claims, 5 Drawing Figures

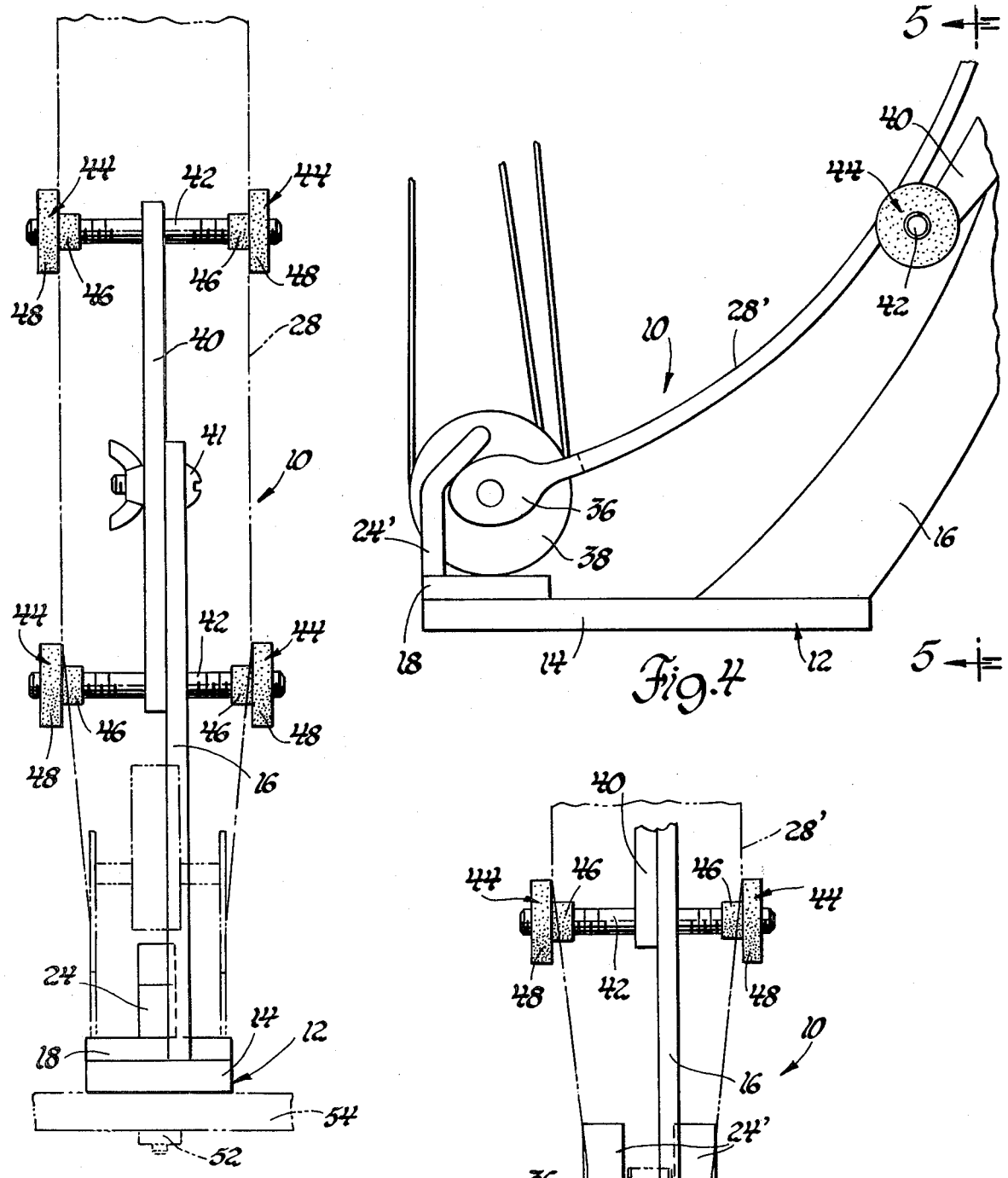

BOW HOLDER

BACKGROUND OF THE INVENTION (1) Field of the Invention

The instant invention relates to archery bow holders for maintaining a bow in a predetermined rest position while the archer awaits a prey.

(2) Description of the Prior Art

Hunters that use a bow and arrow to hunt prey, especially those that use large compound bows, often spend a minimum of six hours each day waiting for the prey to come into range. Generally, a compound bow is used. These bows are quite heavy and, thus, there is no comfortable way to maintain the bow in a constantly prepared shooting position during the waiting time. The problem is further complicated in that many archers use tree stands wherein a tree stand is attached to a tree and the archer sits on the tree stand.

Bow holders have been devised for maintaining a bow in an upright position; however, these holders do not maintain the bow in a ready position for immediate use by the archer and, if the holder is attached to the bow, the archer must take the bow and holder when the prey is sighted. This additional movement causes noise which frequently alerts the prey to the hunter's presence.

The instant invention solves these problems by providing a bow holder which maintains any one of a variety of bows having various sizes in a ready position and, further, allows the archer to remove the bow from the holder with a minimum amount of noise. The holder is adapted to receive the larger and heavier compound type bows.

SUMMARY OF THE INVENTION

The instant invention provides an archery bow holder to maintain a bow in a predetermined rest position. The bow holder includes a primary support structure for supporting a first auxiliary support mounted on the primary support structure for adjustment relative thereto. A second auxiliary support cradle, spaced from the first auxiliary support, is mounted on the primary support structure for adjustment relative thereto thereby adapting the instant invention for holding bows of various sizes in a predetermined rest position. Retaining members are also provided for allowing the bow to be removed from the holder with a minimum amount of noise, while retaining the bow on the holder.

PRIOR ART STATEMENT

An example of a prior art archery bow holder is the U.S. Pat. No. 3,256,872 to Koser, issued June 21, 1966. The Koser patent teaches a bow holder for supporting a bow in a generally upright position. The bow holder includes a bow support platform pivotally mounted on support legs. The holder is secured to the bow such that when the bow is to be used, the support legs fold into the bow. The Koser patent does not teach a holder for a hunting bow which adjustably holds any one of a variety of bows in a ready-to-use position which permits easy removal from the bow support with a minimum amount of motion and noise.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a side elevational view of a preferred embodiment of the bow holder of the instant invention illustrating a portion of a compound bow supported thereon and, in phantom lines, means for mounting the bow holder to a portion of a tree stand or the like;

FIG. 3 is a view taken substantially along lines 3—3 of FIG. 1, again showing the bow in phantom lines;

FIG. 4 is a fragmentary side view, corresponding generally to FIG. 1, but illustrating an alternative embodiment of the instant invention; and FIG. 5 is a view taken substantially along lines 5—5 of FIG. 4, but showing the bow in phantom lines.

DESCRIPTION OF PREFERRED EMBODIMENTS

Figure 1:
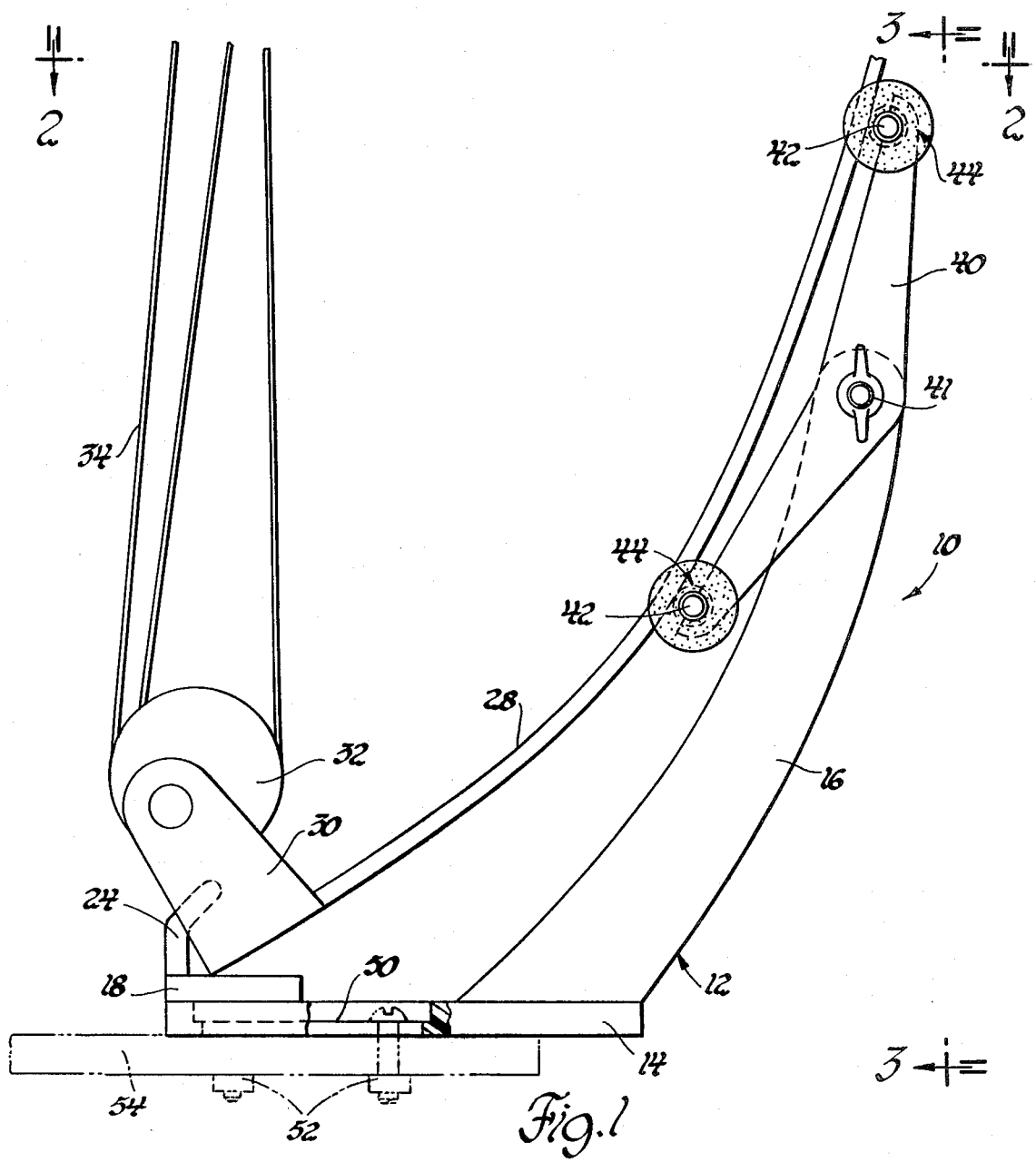
Figure 2:
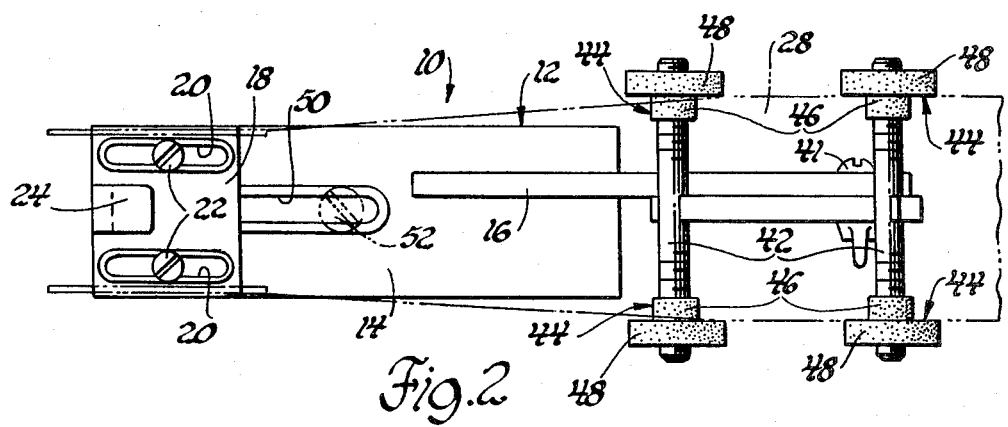
FIG. 2 is a view taken substantially along lines 2—2 of FIG. 1 but showing the bow in phantom lines.

Referring now to the drawings, and particularly FIGS. 1 through 3 thereof, an archery bow holder constructed in accordance with one preferred embodiment of this invention for maintaining a bow in a predetermined rest position is illustrated generally at 10. The bow holder comprises a primary support means indicated generally at 12 and comprising a base member or plate 14 and an arcuately curved support arm 16 having its lower end formed integral with or otherwise suitably secured to the base member 14 and extending arcuately upwardly therefrom.

The bow holder further includes a first auxiliary support means comprising a bracket 18 overlying the base member 14 and having a pair of laterally spaced elongated slots 20 therein. A pair of suitable fastening means 22 extend through the respective slots 20 and are threadably or otherwise suitably releasably secured to the base member 14 beneath the bracket 18. Thus, the fastening means 22 may be loosened to allow the bracket 18 to be slidably adjusted along the base member 14 within the limits of the slots 20, the fastening means 22 then being tightened within the slots to secure the bracket 18 in any desired adjusted position with respect to the base member 14. A finger-like retaining means 24 has its lower end formed integral with or otherwise operatively rigidly secured to the bracket 18 between the slots 20 and extends upwardly and forwardly thereof to support a lower portion of a bow as will be described hereinafter.

More specifically, in the embodiment of FIGS. 1 through 3, the bow holder 10 is adapted to be used with a conventional compound bow 28 of the bracket type; that is, of the type wherein a generally U-shaped bracket 30 has its base suitably secured at the end of the bow by suitable fasteners for rotatably supporting a pulley 32 between the upstanding legs thereof, and which pulley supports the bow string 34 in cooperation with a similar pulley similarly mounted at the other end of the bow as will be readily apparent to those skilled in this art. The upper end of the finger-like retaining means 24 is disposable between the upstanding side legs of the U-shaped bracket 30 and engageable with the base thereof to support a bottom end portion of the bow 28.

At this juncture, reference will be made to the alternate embodiment of FIGS. 4 and 5 illustrating a modified finger-like retaining means for use with conventional compound bows of the split-limb type which are well-known to those acquainted in the art. Like numerals are employed in FIGS. 4 and 5 to indicate the structure corresponding to that previously described. In this embodiment, the conventional split-limb bow includes a slotted end defined by the laterally spaced split limb or leg members 36 which suitably operatively pivotally support the pulley 38 between the limb or leg members of the bow, the pulley 38 again supporting one portion of the bow string in a conventional manner. In this embodiment, the finger-like retaining means comprises two laterally spaced finger-like retaining means 24' having their lower ends formed integral with or otherwise operatively rigidly secured to the bracket 18 and extending upwardly therefrom so that the upper ends thereof are engageable with the end portions of the limb or leg members 36 of the split limb bow 28'. The plate 18 is substantially identical to the plate 18 previously described in connection with FIGS. 1 through 3, and is adjustably slidably supported on the base member 14 also as previously described.

In each embodiment, the bow holder 10 further includes a second auxiliary support means comprising a cradle arm 40 adjustably pivotally connected intermediate its ends to the support arm 16 in spaced relation to the bracket 18 by a suitable fastening means 41 such as a screw and wing nut. Thus, by loosening the fastening means, the cradle arm 40 may easily pivotally adjusted in relation to the support arm 16 and the bracket 18 to accommodate bows of varying curvature and, in coaction with the adjustable bracket 18, dispose any given bow in a predetermined attitude or rest position with respect to the vertical as the archer may desire.

A pair of shaft members 42 are respectively operatively secured to the cradle arm 40 on opposite sides of and extending substantially parallel to the pivot axis of the cradle arm as defined by the fastening means 41. Each of the shaft members 42 has threaded end portions extending laterally to each side of the plane of pivotal adjustment of the cradle arm 40 about its pivot axis.

The numeral 44 generally indicates bow-retaining members which are preferably made of an integral organic or polymeric material or other noise-suppressing material and comprise an axially extending hub portion 46 and an enlarged shoulder portion projecting radially therefrom. The retaining members 44 each have an internal threaded bore for axial threadable adjustable mounting on the threaded end portions of the respective shaft members 42 for independent selective adjustment of the lateral distance therebetween on each of the shaft members 42 to accommodate bows of varying widths. As will be noted particularly in phantom line in FIGS. 2, 3 and 5, the respective bow-retaining members 44 are laterally adjusted on their respective shaft members 42 so that the bow will be supported directly on the hub portions 46 while being retained laterally by the shoulder portions 48 to prevent the bow from tipping laterally from the bow holder. Moreover, the bow does not engage the shaft members 42 but, rather, rests upon the hubs 46 of the bow-retaining members so that the archer may mount the bow on the holder and retrieve it therefrom without causing an inordinate amount of noise which might frighten the prey being hunted.

As illustrated in FIGS. 1 through 3, the base member 14 may be provided with a slot 50 therethrough adapted to receive suitable fastening means 52 for securing the base member 14 to a tree stand 54 or other such suitable support. As will be apparent, the base member 14 may be secured to support members other than a tree holder as the archer may desire.

The operation of the invention will now be described with particular reference to the embodiment illustrated in FIGS. 1 through 3 as it will become apparent that the operation of such embodiment is basically identical to the operation of the embodiment of FIGS. 4 and 5, the principal difference residing in the fact that the embodiment of FIGS. 1 through 3 is adapted to be utilized with a conventional compound bow of the bracket type while the embodiment of FIGS. 4 and 5 is adapted to be used with a conventional compound bow of the split-limb type. The fasteners 22 are loosened to adjustably locate the bracket 18 in a predetermined desired position along the base member 14, and then the fasteners are tightened to hold the bracket 18 in the selected adjusted position. In similar fashion, the fastening means 41 is loosened to permit pivotal rotation of the cradle arm 40 to a predetermined position with respect to the support arm 16 and with respect to the upstanding finger-like retaining means 24 on the bracket 18. In other words, the position of the finger-like retaining means 24 and the respective positions of the bow-retaining members 44 are each adjusted relative to each other and to the support arm 16 to accommodate a bow 28 of a given curvature and so as to dispose such bow in a desired attitude or rest position with respect to the vertical. In addition, the retaining members 44 are respectively adjusted axially along the threaded portions of the shaft members 42 to accommodate the width of the particular bow being used. The bow is then mounted on the bow holder 10 with the lower portion thereof being engaged and supported by the finger-like retaining means 24 and an upper portion thereof resting on the hub portions 46 of the retaining members 44 while being confined laterally by the radially projecting shoulder portions 48 of the retaining members 44. Therefore, the bow is disposed in a predetermined position of rest as desired by the archer as he awaits the prey. When the prey comes into range, the archer may easily and quickly grasp the bow and remove it from the bow holder relatively noiselessly and assume the shooting position.

As alluded to previously, the operation of the embodiment of FIGS. 4 and 5 is virtually identical to that previously described. The only difference is that the pair of finger-like retaining means 24' coact with the spaced leg portions 36 of the split-limb bow to support the end portion thereof.

While but two forms of the invention have been shown and described, other forms will now be readily apparent to those acquainted with this art. Therefore, it is to be understood that the embodiments illustrated in the drawings and described above are merely for illustrative purposes, and are not to limit the scope of the invention which is defined by the claims which follow.

The embodiments of the invention in which an exclusive property or privilege is claimed are defined as follows:

1. An archery bow holder to maintain a bow in a predetermined rest position comprising primary support means, first auxiliary support means mounted on said primary support means for adjustment relative thereto, and second auxiliary support means mounted on said primary support means for adjustment relative thereto to hold bows of varying sizes in predetermined rest positions, and wherein said primary support means comprises a base member and a support arm extending therefrom, said first auxiliary support means comprising bracket means slidably mounted on said base member for adjustment relative thereto and being operatively engageable with a portion of a bow to be held, said second auxiliary support means comprising a cradle arm adjustably pivotally connected to said support arm in spaced relation to said bracket means to operatively support another portion of the bow.

2. An archery bow holder to maintain a bow in a predetermined rest position comprising primary support means, first auxiliary support means mounted on said primary support means for adjustment relative thereto, and second auxiliary support means mounted on said primary support means for adjustment relative thereto to hold bows of varying sizes in predetermined rest positions, and wherein said primary support means comprises a base member and a support arm extending upwardly therefrom, said first auxiliary support means comprising bracket means slidably mounted on said base member for adjustment relative thereto and including means operatively engageable with a portion of a bow to be held, said second auxiliary support means comprising a cradle arm adjustably pivotally connected intermediate its ends to said support arm in spaced relation to said bracket means to operatively support another portion of a bow, at least a pair of shaft members respectively operatively secured to said cradle arm on opposite sides of and extending substantially parallel to the pivot axis of the latter, each of said shaft members having threaded end portions extending laterally to each side of the plane of pivotal adjustment of said cradle arm about its pivot axis, and bow retaining members respectively axially threadably adjustably mounted on said threaded end portions of said shaft members for independent selective adjustment of the lateral distance therebetween on each of said shaft members to accommodate bows of different widths.

3. An archery bow holder to maintain a bow in a predetermined rest position comprising primary support means, first auxiliary support means mounted on said primary support means for adjustment relative thereto, and second auxiliary support means mounted on said primary support means for adjustment relative thereto to hold bows of varying sizes in predetermined rest positions, and wherein said primary support means comprises a base member and a support arm extending upwardly therefrom, said first auxiliary support means comprising bracket means slidably mounted on said base member for adjustment relative thereto and including means operatively engageable with a portion of a bow to be held, said second auxiliary support means comprising a cradle arm adjustably pivotally connected intermediate its ends to said support arm in spaced relation to said bracket means to operatively support another portion of a bow, shaft members respectively operatively secured to said cradle arm on opposite sides of and extending substantially parallel to the pivot axis of the latter, and bow retaining members mounted on said shaft members.

4. An archery bow holder to maintain a bow in a predetermined rest position comprising primary support means, first auxiliary support means mounted on said primary support means for adjustment relative thereto, and second auxiliary support means mounted on said primary support means for adjustment relative thereto to hold bows of varying size in predetermined rest positions, and wherein said primary support means comprises a base member and a support arm extending upwardly therefrom, said first auxiliary support means comprising bracket means slidably mounted on said base member for adjustment relative thereto and including means operatively engageable with a portion of a bow to be held, said second auxiliary support means comprising a cradle arm adjustably pivotally connected intermediate its ends to said support arm in spaced relation to said bracket means to operatively support another portion of a bow, shaft members respectively operatively secured to said cradle arm on opposite sides of and extending substantially parallel to the pivot axis of the latter, each of said shaft members having threaded end portions extending laterally to each side of the plane of pivotal adjustment of said cradle arm about its pivot axis, and bow retaining members respectively axially threadably adjustably mounted on said threaded end portions of said shaft members for independent selective adjustment of the lateral distance therebetween on each of said shaft members to accommodate bows of different widths.

5. The invention as defined in claim 4 wherein each of said bow retaining members is made of an integral organic polymeric material and comprises an axially extending hub portion and a shoulder portion projecting radially therefrom, a portion of a bow to be held resting on said hub portion and being retained laterally by said shoulder portion.

6. The invention as defined in claim 4 wherein said base member includes means for securing said base member to a tree stand or other such support member.

7. An archery bow holder to maintain an archery bow in a predetermined rest position relative to the vertical when not in use comprising primary support means including a base member and a support arm extending upwardly therefrom, first auxiliary support means comprising bracket means slidably adjustably mounted on said base member for adjustment relative thereto and including upstanding retaining means operatively engageable with an end portion of a bow to be held, a second auxiliary support means comprising a cradle arm adjustably pivotally connected intermediate its ends to said support arm in spaced relation to said bracket means to support a portion of a bow spaced from said end portion thereof, a pair of shaft members respectively operatively secured to said cradle arm on opposite sides of and extending substantially parallel to the pivot axis of the latter, each of said shaft members having threaded end portions extending laterally to each side of said cradle arm, and bow retaining members respectively axially threadably adjustably mounted on said threaded end portions of said respective shaft members to independently selectively adjust the lateral distance between said bow retaining members on each of said shaft members to accommodate and support bows of different widths.

8. The invention as defined in claim 7 wherein each of said bow retaining members comprises a hub portion and a shoulder portion projecting radially therefrom, a portion of a bow to be held resting on said hub portion and being retained laterally by said shoulder portion.

* * * * *